United States Patent
Kästle

(10) Patent No.: US 6,631,281 B1
(45) Date of Patent: Oct. 7, 2003

(54) RECOGNITION OF A USEFUL SIGNAL IN A MEASUREMENT SIGNAL

(75) Inventor: Siegfried Kästle, Nufringen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/018,067

(22) PCT Filed: Jun. 10, 1999

(86) PCT No.: PCT/EP99/03995

§ 371 (c)(1),
(2), (4) Date: May 14, 2002

(87) PCT Pub. No.: WO00/77674

PCT Pub. Date: Dec. 21, 2000

(51) Int. Cl.[7] ................................................ A61B 5/00
(52) U.S. Cl. ....................... 600/336; 600/323; 600/481; 702/19
(58) Field of Search ................................. 600/300, 309, 600/310, 322, 323, 330, 336, 481, 508, 529; 702/19; 708/403, 404

(56) References Cited

U.S. PATENT DOCUMENTS 4,837,718 A * 6/1989 Alon ........................... 702/143
5,400,795 A * 3/1995 Murphy et al. ............. 600/515

FOREIGN PATENT DOCUMENTS

| DE | 42 20 429 A | * | 1/1994 |
| EP | 0 114 463 B | * | 8/1988 |
| EP | 0 335 357 A | * | 10/1989 |
| EP | 0 623 882 A | * | 11/1994 |
| EP | 0 870 466 A | * | 10/1998 |
| FR | 2 724 029 A | * | 1/1996 |

* cited by examiner

*Primary Examiner*—Eric F. Winakur
(74) *Attorney, Agent, or Firm*—John Vodopia

(57) ABSTRACT

Recognition of a useful signal in a measurement signal by: transforming the measurement signal for a given time slot into the frequency range; identifying frequency peaks in the transformed measurement signal; assigning identified frequency peaks to temporal progressions of identified frequency peaks of one or more preceding time slots to the extent the identified frequency peaks are already present; assigning the temporal progressions to one or more families which are comprised of a fundamental wave and/or of one or more harmonic waves; selecting a family as that which should represent the useful signal, and; selecting a frequency peak of the current time slot from the selected family as that which should represent the measured value of the useful signal in this time slot. The signal filtering is preferably used for medical measurement signals, preferably in the area of pulsoximetry and for measuring blood pressure or determining the heart rate.

13 Claims, 8 Drawing Sheets

RECOGNITION OF A USEFUL SIGNAL IN A MEASUREMENT SIGNAL

BACKGROUND OF THE INVENTION

The present invention relates to the recognition of a useful signal in a measurement signal.

In general, the measurement of signals can be roughly divided into a) the recognition of individual, more or less singular events and b) the monitoring of more or less frequently recurrent, essentially periodical signals. In both cases, superimposing disturbances limit the confidence level of the measurement and it is desirable to avoid, suppress or filter these disturbances.

Periodical signals are herein understood to mean signals in which the useful signal has at least a periodical component at least in a given time slot, but whose frequency may be time-dependent.

Particularly in the medical field of patient monitoring, the recognition of the useful signal and suppression of disturbances is essential, because disturbances lead to false interpretations of the measured values or may render the measurement as a whole unusable.

A measurement which has proved to be very sensitive to disturbing influences, is the pulsoximetric determination of the oxygen content of blood, because pulsoximetry is often more affected by motion artifacts than by the pulse signal determining the blood oxygen content. Pulsoximetry relates to the non-invasive, continuous determination of the oxygen content of blood (oximetry), based on the analysis of the photospectrometrically measured pulse. To this end, it is necessary that a pulse curve (plethysmogram) is available in the case of a plurality of wavelengths. In practice, substantially all apparatuses operate at two wavelengths only, so that low-cost, compact solutions are possible. The photometry principle is based on the fact that the quantity of the absorbed light is determined by the degree of absorption of a substance and by the wavelength. Pulsoximeters utilize the aspect that the arterial blood volume, and only the arterial blood volume, pulsates in the rhythm of the heartbeat. In order to determine the value of oxygen saturation from the determined measured data, a ratio is derived from the measured data, which ratio then represents the oxygen saturation value. The fundamental aspects and fields of use of pulsoximetry are generally known and frequently described, particularly in EP-A-262778 (with a good theory outline), U.S. Pat. No. 4,167,331, or by Kästle et al. in "A New Family of Sensors for Pulsoximetry", Hewlett-Packard Journal, vol. 48, no. 1, pp. 39 to 53, February 1997.

For the pulsoximetric measurement, particularly methods in the temporal range, adaptive filter spectral analyses and methods in the temporal frequency range have been proposed as methods of recognizing and suppressing artifacts. A detailed description of these methods of suppressing artifacts (which methods are less interesting within the context of this application) is given in the international patent application in the name of the applicant, filed on the same application date (file 20-99-0010).

While the useful signal should remain possibly unaffected in the above-mentioned methods of recognizing and suppressing artifacts, and only the artifacts should be eliminated, the prior art also discloses methods in which, conversely, (only) the useful signal should be filtered from the measurement signal. In addition to the temporal range method (again less interesting within the context of this invention), particularly those methods in which the measurement signals are examined in the frequency range have proved to be advantageous for determining or filtering a periodical useful signal from a more or less disturbed measurement signal. Such methods for use in pulsoximetry are described, inter alia, in U.S. Pat. No. 5,575,284 (Athan), WO-A-96 12435 (Masimo) or EP-A-870466 (Kästle).

According to WO-A-96 12435, a signal is selected as useful signal after transformation of the pulsoximetric measured values in the frequency range by determining the frequency component having the strongest amplitude.

EP-A-870466, by the same inventor and the same applicant, discloses a method of selecting the pulsoximetric signal in accordance with the physiological relevance of the frequency components. After optional suppression of the DC component of the two pulsoximetric raw, or unconditioned, signals (red and infrared), the unconditioned signal values which are present in a continuous time slot are transformed into the frequency range by means of a Fourier transform (here, Fast Fourier Transform—FFT). Ratios of the coefficients of the amplitude spectrum are formed from the transformed unconditioned signals for all frequency peaks. When the infrared spectrum is graphically plotted in the x direction and the red spectrum in the y direction, a representation having needle-like peaks is obtained. These needles correspond to the peaks of the spectra, with very thin needles being obtained for undisturbed signals and the relevant needles of the fundamental and harmonic waves being superimposed. The angle of the needles with respect to the axes corresponds to the saturation value. Since the representation of the spectra is similar to a pincushion in this case, the method described in EP-A870466 is also referred to as "pincushion algorithm".

To identify the needle representing the pulsoximetric signal, a distance spectrum is first determined in the pincushion algorithm from the complex amplitudes of the red and infrared spectra. The distance spectrum describes the distance between every individual point in the needle diagram from the origin. The individual needles are determined from this distance spectrum by considering the maxima and the attendant foot points. Only those needles which fulfill a series of given criteria are maintained for the further considerations. The reduced selection of needles is subjected to a further classification. Needles representing the useful signal should fulfill the criteria that the peaks fit well in a harmonic frequency range, as many harmonic waves as possible are available, the needles are possibly thin and the frequency of the fundamental wave as well as the saturation value, the perfusion and the pulse rate are within physiological ranges. An overall evaluation for each needle is effected by assigning points or K.O. criteria to each of these criteria. The needle that is given the largest number of points, or in other words, best satisfies the criteria, and has been given at least a minimal number of points is used for determining the output value for the pulsoximetric measured value. Optionally, a comparison with previous output values may be used for plausibility control purposes, and in the case of a significant deviation from the previous output values, the newly determined output value is rejected and no new value will be displayed.

The methods of determining the useful signal by transformation into the frequency range have proved to be clearly less sensitive to disturbances than the filtering method in a temporal range. However, also these methods may yield uncertainties in the frequency range, dependent on the disturbing situation, in which, for safety's sake, no value or only a questionable value can be supplied.

OBJECT AND SUMMARY OF THE INVENTION

It is therefore an object of the present invention to enhance the recognition of a periodical useful signal in a determined measurement signal. This object is solved by the characteristic features of the independent claims. Advantageous embodiments are defined in the dependent claims.

According to the invention, the recognition of a periodical useful signal in a (disturbed) measurement signal is effected in several process steps.

In a first step, there is a transformation of the measurement signal for a given time slot into the frequency range. The Fast Fourier Transform (FFT) is particularly suitable for this purpose, but other arbitrary transformations may be used alternatively.

Optionally, the measurement signal may be filtered before or after the transformation. Preferably, such a filtering is effected, for example, by reducing the DC component (particularly as described in EP-A-870466 or EP-A-870465) and/or by suppressing transient disturbances, particularly as described in the above-mentioned international patent application in the name of the applicant, filed on the same date of application under file number 20-99-0010.

In a second step, there is an identification of frequency peaks (also referred to as needles) in the transformed time slot of the measurement signal. Such an identification may preferably be effected by using a distance spectrum as described above for the pincushion algorithm in EP-A-870466.

In a third step, there is an assignment of identified frequency peaks of the current time slot to temporal progressions (also referred to as strings) of identified frequency peaks of one or more preceding time slots to the extent that identified frequency peaks are already present. This "concatenation of the needles to strings" is preferably effected by an initialization, for example, upon a new start, at which the first obtained set of needles is taken to establish a set of strings. A continuous attachment of fitting needles may link up with this string, with a needle being considered to be fitting when there are few deviations as regards predetermined criteria from the last link in the string. The decision whether a needle is to be considered fitting is taken by combining given criteria by means of a fuzzy logic. When no new needle can be assigned to an available string, a gap preferably remains, and the string can be either ended or replaced by a new string if the gap becomes too long (preferably about 30 s).

In a fourth step, there is an assignment of temporal progressions (strings) to one or more families each comprised of a fundamental wave and one or more harmonic waves. Such an assignment or concatenation of the strings to harmonic waves is preferably effected by examining in how far given characteristic features exist between the strings, which features jointly indicate that the strings belong to the same useful signal. Such an examination is preferably performed by combining suitable criteria such as harmonic frequency relations, expected amplitude decrease of the harmonic wave range and/or proportionally equal trend development of the frequencies and/or amplitudes. The combination of the criteria is preferably also effected by means of a fuzzy logic.

In a fifth step, there is a selection of a family as that which should represent the useful signal. The words "should represent" are understood to mean that the question whether the selected family also actually represents the useful signal also depends on the selection criteria used. However, since, except in simulated signal ratios, a family can never be recognized with absolute certainty as the "true" family representing the useful signal, the selection should always be considered in the sense of a greatest probability (for the representation of the useful signal by the selected family).

The selection of a family is also preferably effected by combining predetermined criteria such as the existence of a fundamental wave, a first harmonic wave and a second harmonic wave, average fit accuracy of the strings, number of valid needles in a string (i.e. the length of the string), continuity of a string, number of gaps in a string, and the quality of relations between fundamental wave and first harmonic wave, fundamental wave and second harmonic wave, as well as between the first harmonic wave and the second harmonic wave. The combination of criteria is preferably also effected by means of a fuzzy logic.

The selection of a family may be alternatively or additionally effected by means of a plausibility check of the family with respect to previous output values, with the most plausible family being selected.

In a sixth step, a frequency peak of the current time slot is selected from the selected family as that which should represent the measured value of the useful signal in this time slot. The current measured value of the useful signal can then be computed or determined in another way from this selected frequency peak, in so far as this value does not already correspond to the measured value. Also in this case, the words "should represent" are understood to mean that the selection is considered in the sense of a greatest probability (for the representation of the measured value of the useful signal by the selected frequency peak).

The selection of the frequency peak representing the current measured value of the useful signal is preferably effected by combining predetermined criteria by means of a fuzzy logic. Criteria relating to a plausibility of the current measured value as compared with previous measured values and/or as compared with expected or useful values are preferably used as criteria.

Optionally, a plausibility check may be performed in the sixth step after selection of the frequency peak, so as to check whether the selected frequency peak actually corresponds to an expected measured value of the useful signal and whether a measured value possibly derived from the selected frequency peak is to lead to an output value, or whether no measured value at all should be outputted for this time slot. Such a plausibility check is preferably performed by comparing the current measured value with previous measured values and/or expected or useful values.

The measured value output for the current time slot is preferably effected together with a quality indicator giving a quantitative statement about the reliability of the supplied measured value. This quality indicator is preferably determined by means of a method as described in the international patent application in the name of the same applicant, filed on the same date of application (file 20-99-0011). The description of the method of determining the quality indicator in this patent application is herein incorporated by reference.

The present invention is preferably used for useful signal filtering of medical measurement signals, for example, in the field of pulsoximetry, blood pressure measurement (invasive or non-invasive) or heart rate determination by means of ECG or ultrasound. The invention is of course not limited to the signal filtering, particularly of the pulsoximetry mentioned above, but can be used for useful signal filtering of arbitrary measurement signals.

The invention may also be used for useful signal filtering in those applications in which the measured values are determined only from one or a plurality of unconditioned signals.

To combine criteria and factors, the principles of the known fuzzy logic are used in preferred embodiments, as are particularly described in Altrock C. "Fuzzy logic: Band 1, Technologie", Oldenburg Verlag, Munich, 1995, to which reference is made and will not be further described in this application.

While the history values in the pincushion algorithm described in EP-A-870466 are only considered for selecting a needle to be supplied from the fundamental wave, the method according to the invention takes the history values into account for selecting a harmonic family of strings comprising both a fundamental wave and harmonic wave(s). A family member from the selected family is then selected from the selected harmonic family, which family member should represent the current measured value of the useful signal. The selection of a harmonic family according to the invention thus allows selection of also a harmonic wave as a family member, if the fundamental wave is disturbed, and conversely, and thus clearly enhances the security and reliability of the selection process and thus also the credibility of the possibly determined measured value of the useful signal. A further advantage, particularly also as compared with the mentioned pincushion algorithm is that preceding time slots are also taken into account for the selection of the family members. In the pincushion algorithm, however, preceding time slots are only utilized for a point evaluation for the fundamental wave.

The use of the useful signal filtering according to the invention leads to a noticeable improvement, particularly in the recognition of the useful signal under difficult disturbing conditions. Particularly with a previous disturbance filtering in accordance with the above-mentioned international patent application (file 20-99-0010), increasingly difficult measuring situations can be overcome, and in the further determination and display of a quality indicator in accordance with the above-mentioned international patent application (applicant's file 20-99-0011), the reliability and confidence can be significantly increased, particularly in difficult measurements as in pulsoximetry.

BRIEF DESCRIPTION OF THE DRAWINGS

The invention will hereinafter be elucidated with reference to the drawings, in which identical reference signs relate to identical or functionally equal or similar features.

DETAILED DESCRIPTION OF PREFERRED EMBODIMENTS

A preferred embodiment of recognizing a periodical useful signal in a disturbed measurment signal for determining the oxygen saturation will be described hereinafter. Since known methods are involved in the determination of oxygen saturation, they will not be further described here, and for details, reference is made particularly to the above-mentioned documents.

Particular reference is made to the pincushion algorithm described in EP-A-870466, which also has the selection of the "correct" frequency peak in the Fourier range as a subject. Except for the selection as such, many steps of the method described in EP-A-870466 can therefore be used in analogy with the invention.

As already stated in the opening paragraph, the conventional pulsoximetry method comprises the steps of filtering the signals in a temporal range, evaluating them and then relating them to the corresponding red and infrared amplitudes. In contrast, the fundamental idea of both the known pincushion algorithm (EP-A-870466) and the embodiment according to the invention (hereinafter also referred to as fuzzy needle algorithm (FNA)) is based on subjecting the signals to a frequency transformation and then filtering the transformed signals, evaluating them and utilizing the transformation coefficients for determining the pulsoximeter results such as oxygen saturation, pulse rate and perfusion index.

Figure 1:
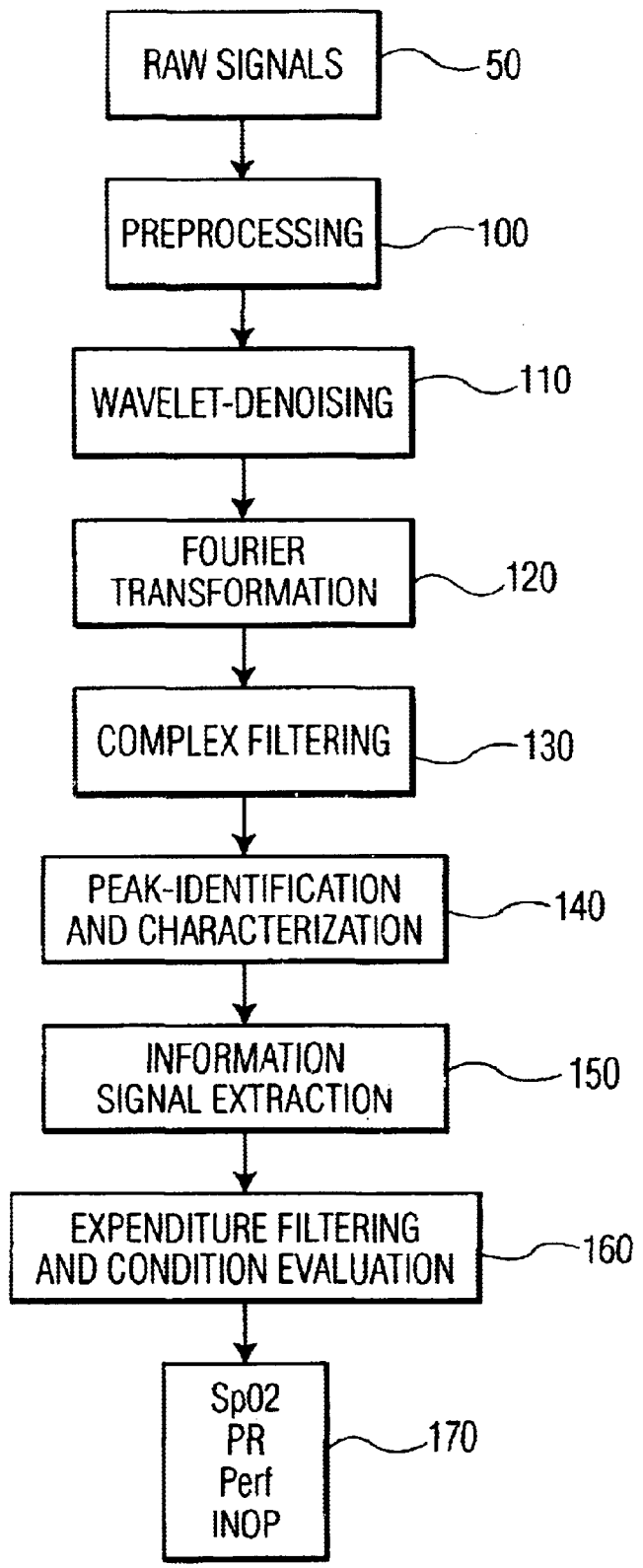
FIG. 1 is a block diagram of the processing steps in accordance with a preferred embodiment of the invention.

FIG. 1 is a block diagram of the processing steps in accordance with a preferred embodiment of the invention. The overall method is cyclically repeated with a clock of preferably one second, i.e. the output values can be refreshed every second.

First, the two measured raw, or unconditioned, signals (block 50) for red and infrared (IR) are subjected to a pre-processing operation in a step 100. In this operation, each unconditioned signal is continuously normalized on its floating DC value. The ratio between the two signals obtained thereby is now already in a direct relation to the SpO$_2$ value. These signals do not only comprise the useful signals but also all possible disturbing components in the pulsoximetry baseband (0 to about 10 Hz).

A first step of eliminating the artifact components is performed in a wavelet denoising stage 110. To this end, the signals are initially divided into short sections, preferably slots of 8 seconds, and disseminated into coefficients by means of appropriate wavelets. The wavelet coefficients are manipulated with the object of suppressing frequency and temporal ranges particularly comprising artifacts. With these modified wavelet coefficients, the retransformation in the temporal range is subsequently performed. For further details of wavelet denoising, reference is made to the international patent application (file no. 20-99-0010) in the name of the same applicant, filed on the same date of application, and its subject regarding wavelet denoising is herein incorporated by reference. Wavelet transformations are particularly described in Mallat S. G., "A Wavelet Tool of Signal Processing, Academic Press, San Diego, 1998, Wickerhauser M V, "Adaptive Wavelet Analysis, Vieweg und Sohn, Braunschweig, 1996, or Daubechies I., "Ten Lectures on Wavelets", CBMS vol. 61 SIAM Press Philadelphia, Pa., 1992.

In a third step 120, a Fast Fourier Transform (FFT) takes place, also sectionally based on the above obtained signal sections.

A further step 130 of suppressing disturbances (real component filtering) now follows. The two complex spectra (red and infrared) obtained are string-related to each other in the complex frequency plane and superimposed on each other. This represents a measure which particularly contributes to suppressing uncorrelated elements of disturbance. Such disturbances are, for example, found in very weak signals when the optoelectric noise component becomes high.

After the relevant amplitude spectra are generated from the complexed red/infrared spectra, individual peaks (also referred to as needles because of their shape in the parametric representation in the ratio plane) are identified and characterized in a step 140. In the case of a signal with a low disturbance, these are essentially the fundamental wave and harmonic waves of the plethysmogram. Per algorithm cycle, preferably up to 10 such peaks are isolated. Each peak may be characterized, inter alia, by a given $SpO_2$ value, a frequency and an amplitude.

In a step 150, all peaks gained in the instantaneous cycle are usefully concatenated with the history peaks so that coherent peak patterns (also referred to as strings) are obtained. These strings are then evaluated on their "strength" and, in accordance with harmony criteria, composed to "families". The term harmony is herein understood to mean more than the frequency relation. When a number of families is available, it is determined with some further relative criteria which one of the families represents the useful signal. The properties of the members of this selected family are then used for the purpose of determining the desired output values. These evaluations are very difficult in the case of disturbances. It has proved that numerous complex combinations should be performed to obtain a robust recognition system which can make a clear-cut distinction between the useful signal and an artifact. This evaluation may be preferably performed in a successful and clear manner by means of a fuzzy logic.

An output filtering and state evaluation are finally performed in a step 160. A non-linear adaptive filter ensures smoothing of the indicator values, which smoothing is particularly necessary in situations that are seriously disturbed. The spontaneous values gained in step 150 are initially supplied to a preferably 60-second output store from which, dependent on the signal quality, an average value more or less far going back into history is formed. Moreover, an evaluation of the instantaneous signal quality and the signal variation of the most recent history can take place so as to decide whether the output values should be extracted (i.e., for example, setting the indicator to "-?-" or "0"), because a reliable derivation cannot be ensured. As regards the evaluation of the signal quality, particular reference is made to the international patent application (file no. 20-99-0011) in the name of the same applicant, filed on the same date of application, and the subject of evaluating the instantaneous signal quality is herein incorporated by reference.

In a last step 170, the determined measured values such as the $SpO_2$ value, the pulse rate (PR), the perfusion index (Perf) and possibly no output value (INOP) may be displayed.

It should be noted that particularly the steps 100, 110 and 130 are not necessary for performing the present invention but are preferably performed as optional steps for improving the signal. Moreover, the step 160 is not important for the subject of the invention but also allows a further improvement as regards the output reliability. Finally, the display step 170 is only optional and the measured values gained may be utilized, for example, for different further processing operations. The steps 100 to 130 will hereinafter not be elucidated because they are method steps known in the state of the art and are individually not further interesting for the subject of the invention.

A DC component (DC)-normalized spectrum for red and infrared is present as a result of the processing operations performed in steps 100 to 130. In the subsequent step 140, the relevant components in this spectrum should be identified and characterized.

Pronounced elevations in the amplitude spectra will hereinafter be denoted as "peaks" in an amplitude-frequency diagram. However, pronounced elevations in a parametric x-y representation of the two amplitude spectra of red and infrared with the frequency as a parameter are denoted as "needles". When there is a good correlation between the two temporal signals, the spectra are also similar and the peaks show up as slim needles in the parametric diagram. It should be noted that the width of the peaks has nothing to do with the width of the needles. Only the similarity of the shape of the corresponding red or infrared peak determines the slimness of the needles: the more similar, the slimmer.

Figure 2A:
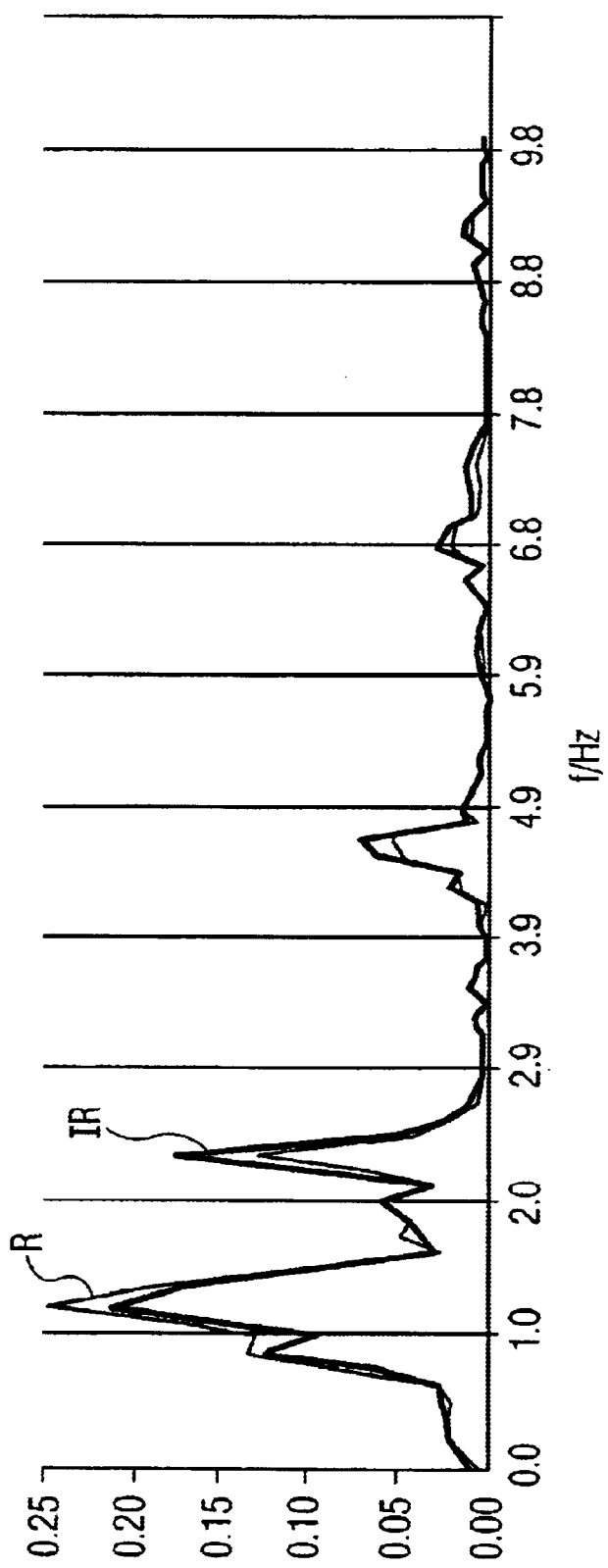
FIGS. 2A and 2B show examples of a disturbed pulsoximetric signal in a frequency representation and as a needle diagram.
Figure 2B:
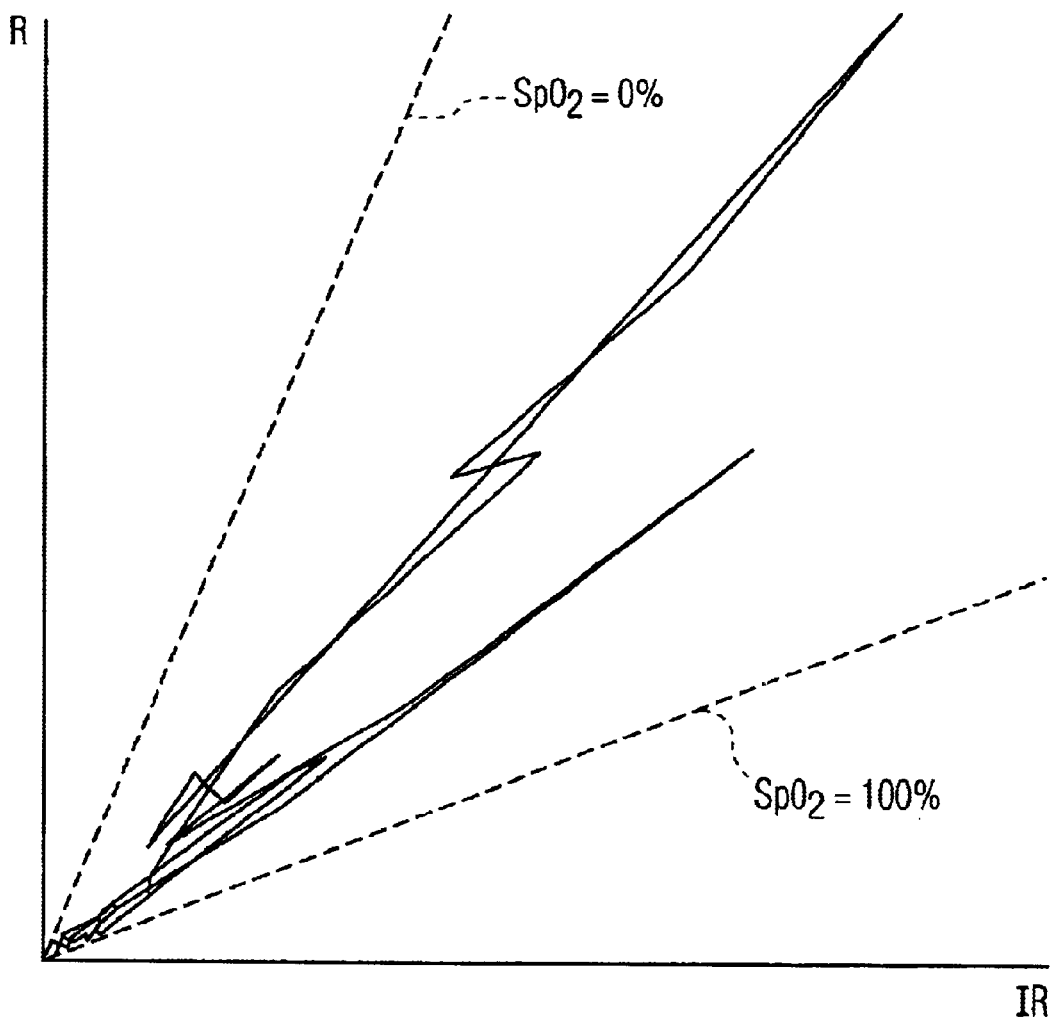

FIG. 2A shows an example of a heavily disturbed but still controllable pulsoximetric signal. The spectra show an intensive disturbance in the 1 Hz range. The fundamental wave of the useful signal becomes visible at about 2.5 Hz and also shows three harmonic waves. FIG. 2B shows the same spectrum as that in FIG. 2A, but this time as a needle diagram. In this needle diagram, the useful signal generates the flat interlaced needles, while the disturbance having the lower frequency projects with its amplitude but, because of the steeper direction, indicates a lower $SpO_2$ value. Based on the linearity of the Fourier transform, the rise of the needles in the needle diagram in principle corresponds to the $SpO_2$ saturation ratio. More accurate indications about the computation of the $SpO_2$ value can be found, particularly in the above-mentioned application EP-A-870466 (pincushion algorithm).

To identify the peaks and needles, a distance spectrum is formed from the red and infrared spectra, defined by $$A(\omega)=\sqrt{\hat{S}_R(\omega)^2+\hat{S}_{IR}(\omega)}$$

Figure 3:
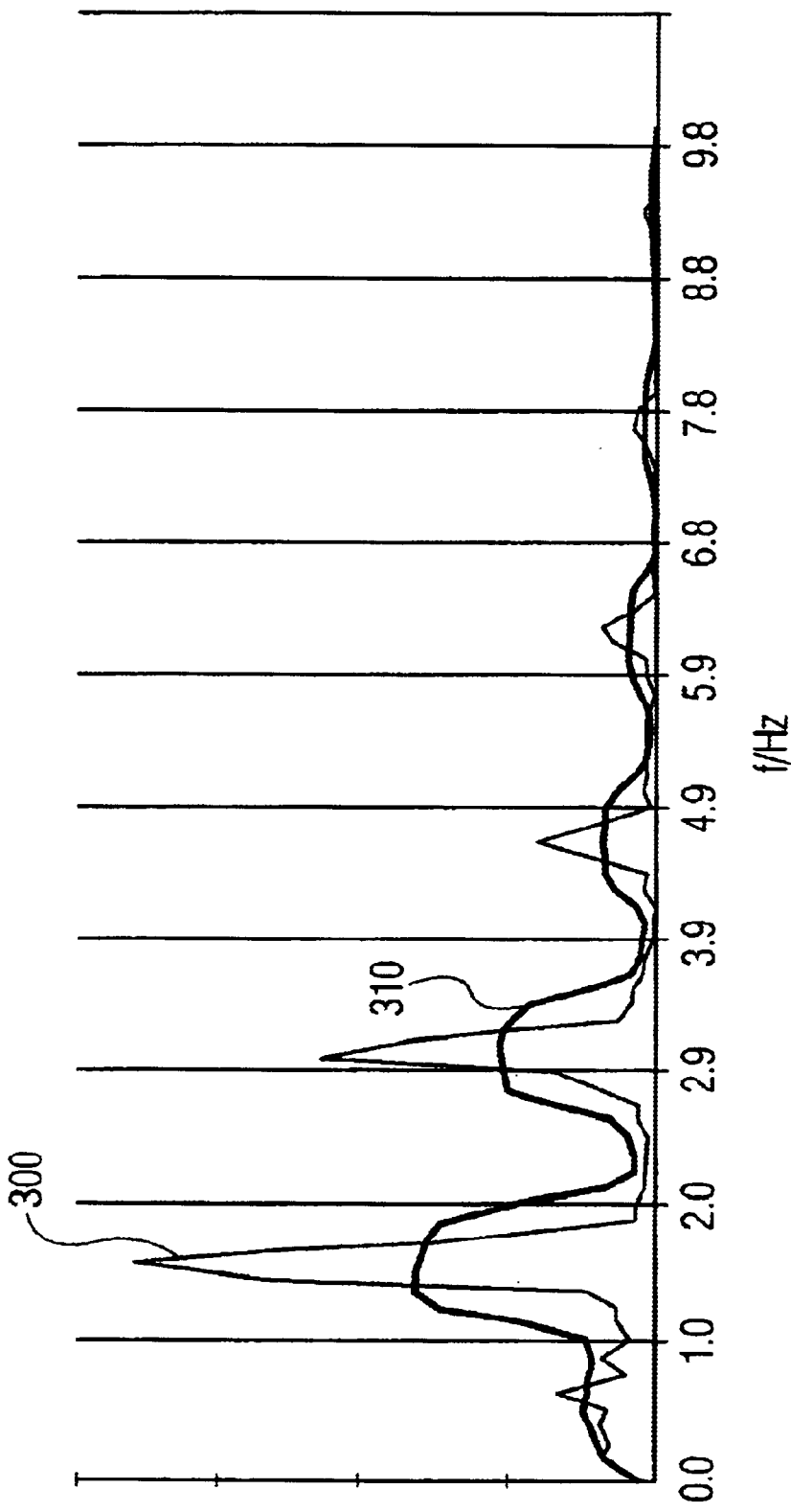
FIG. 3 shows an example of a distance spectrum 300 for a relatively undisturbed standard case, FIG. 4 show SpO$_2$ value, gravity frequency, perfusion and fit accuracy of a low-disturbance episode (FIG. 4A), a disturbed episode (FIG. 4B) and an episode in which the disturbance is eliminated in accordance with the invention (FIG. 4C)

This spectrum describes the distance between each individual point in the needle diagram from the origin. FIG. 3 shows an example of a distance spectrum 300 for a relatively undisturbed standard case.

As a boundary condition, preferably up to 10 individual needles should be identified in each algorithm cycle. Normally, about 3 to 5 of these needles describe the fundamental waves and harmonic waves of the useful signal and the rest is determined by disturbing components. In a preferred embodiment, the following procedure is performed in a needle identification method:

form a threshold value function 310 by symmetrically averaging the distance spectrum 300.

form the difference between the distance spectrum 300 and the threshold value function 310.

search for the 10 highest peaks in this difference spectrum, starting from the highest peak.

determine the foot points on the left and right.

The threshold value function 310 has the object of suppressing broad peaks in the spectra, accentuating narrower elevations and alleviating the sensitivity of the detection in those cases where many peaks are closely adjacent to each other, i.e. when, for example, a useful peak is too narrowly neighbored by a disturbing peak. The threshold value function S(i) is preferably determined by way of the following formula:

$$S(i) = \frac{1}{2k+1}\sum_{i=-k}^{k} A(i)$$

with the foot points of the spectrum i. Preferably, the value k=3 frequency positions and a lift factor l=1.3 is used for a filter width.

The peaks are preferably identified as regards magnitude in a decreasing sequence by means of a maximal value search. The search is ended after either 10 peaks have been found or when no peak with an amplitude of >2% related to the highest peak is present any longer.

To determine the left and right foot points, the following criteria are preferably fixed as criteria for abandoning the foot point search, starting from the peak:

the distance spectrum 300 must have fallen below the threshold value function 310 at least once and maximally twice;

AND the height of the next sample would signify another rise;

OR the foot point of a previously found peak is reached (common foot point);

OR the lower spectral limit (0 Hz) or the upper maximum frequency (for example 10 Hz) is reached.

For each needle thus identified (up to 10 needles), a series of properties is determined which serve for later classification and constitute the basis for determining the pulsoximeter values to be outputted. These are preferably:

gravity frequency; formed from the left and right foot point frequency and the distance spectrum from the points i;

perfusion component from the height of the maximum red and infrared amplitudes;

$SpO_2$ value from the rise of the needles (=ratio);

correlation coefficient of the regression curve through the needle foot points.

In a preferred embodiment, further criteria are used to check whether the signal satisfies a given minimal requirement and has adequate features of a plethysmogram. If this is not the case, the recognized needles should be fully suppressed because there is otherwise a high risk that disturbances are inadvertently admitted as useful signals or that a superimposition of excessive disturbances leads to large measuring errors. Particularly the following criteria have proved to be advantageous in this respect:

correlation of the temporal signals (red and infrared)

too many high peaks decrease of the amplitude of the spectrum in the direction of the harmonic waves spread of the Fourier coefficients surface area covered by the peaks spread of the $SpO_2$ values which are assigned to the selected needles.

When preferably one of these 6 criteria exceeds a predetermined limit value, this preferably leads to an extraction of all needles found in this cycle. It is true that the absence of needles does not immediately lead to a desired INOP indication of the pulsoximeter but will lead to this indication after a given period of time, dependent on the history.

With every clock cycle (preferably 1 s) of the Fourier needle algorithm (FNA) according to the invention, up to 10 needles are found and characterized in step 140. In the subsequent step 150, a concatenation of the newly gained needles with what are called strings is effected, preferably by means of a fuzzy logic combination. Strings consist of lined-up "fitting" needles from previous cycles, i.e. the temporal trend from recent history. Needles, if fitting, are lined up cycle by cycle on available strings, just like pearls on a necklace. When a needle does not find a fitting string, it can start a new string under given conditions. Up to 10 strings are preferably held parallel and traced.

Figure 4A:
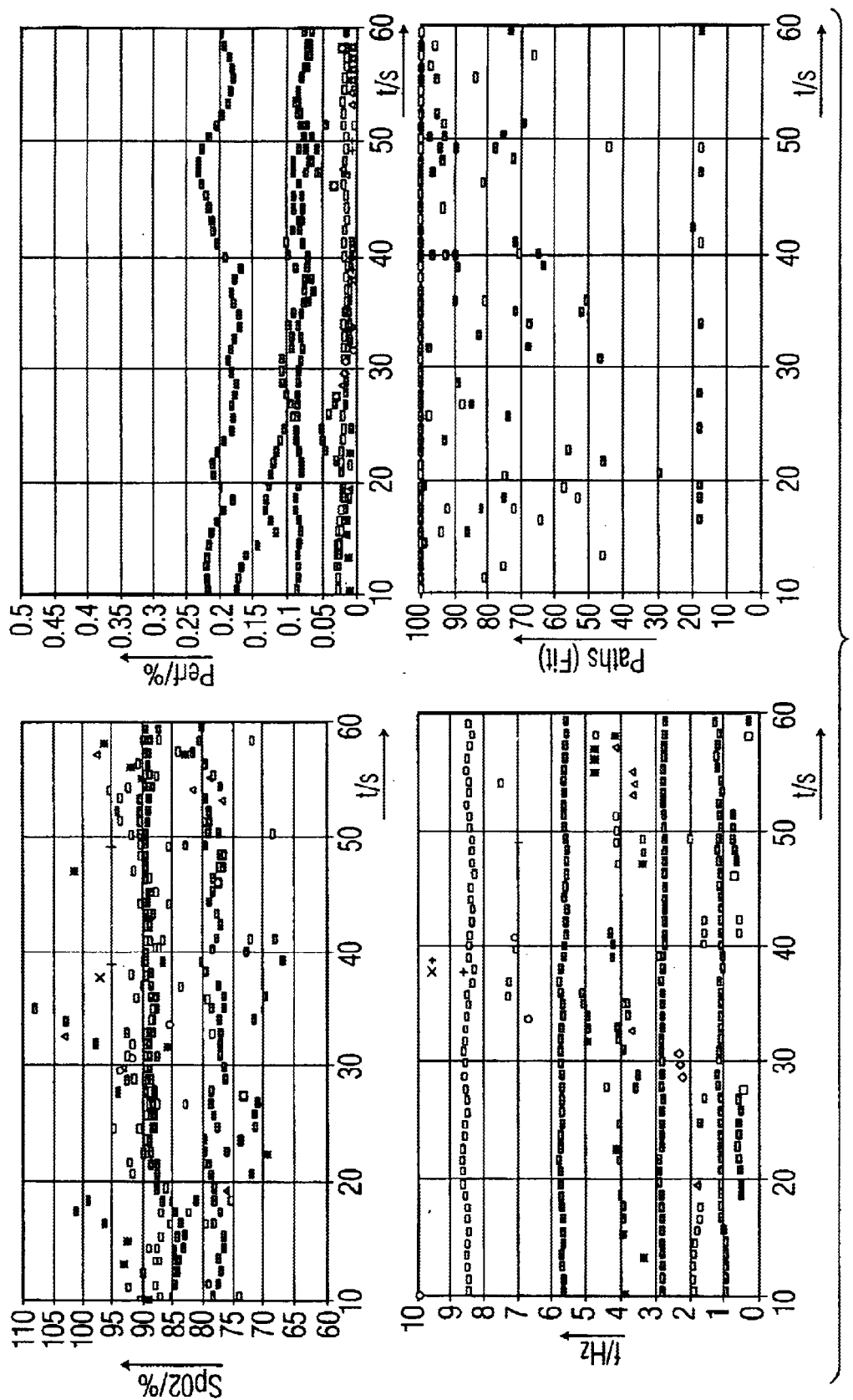

FIG. 4A shows a low-disturbance episode in which, except for a breathing-induced side line in the low frequency range around approximately 1 Hz, the dominant strings originate from the useful signal. The diagram at the top left represents the $SpO_2$ value in percents and the diagram at the bottom left represents the gravity frequency in Hz, while the diagram at the top right represents the perfusion component in percents and the diagram at the bottom right represents the fit accuracy of all needles in accordance with a point evaluation scale in which 100 is the maximum. Accepted needles which belong to strings are shown as small bars, whereas rejected needles are characterized by other symbols. In the trend diagram of the frequencies (bottom left) the useful signal is recognized at just 3 Hz and multiples thereof. Since this is a low disturbance signal, almost all needles reach the maximum fit accuracy (here 100 points) which is not recognizable in the diagram at the bottom right because the different strings are drawn one upon the other.

Figure 4B:
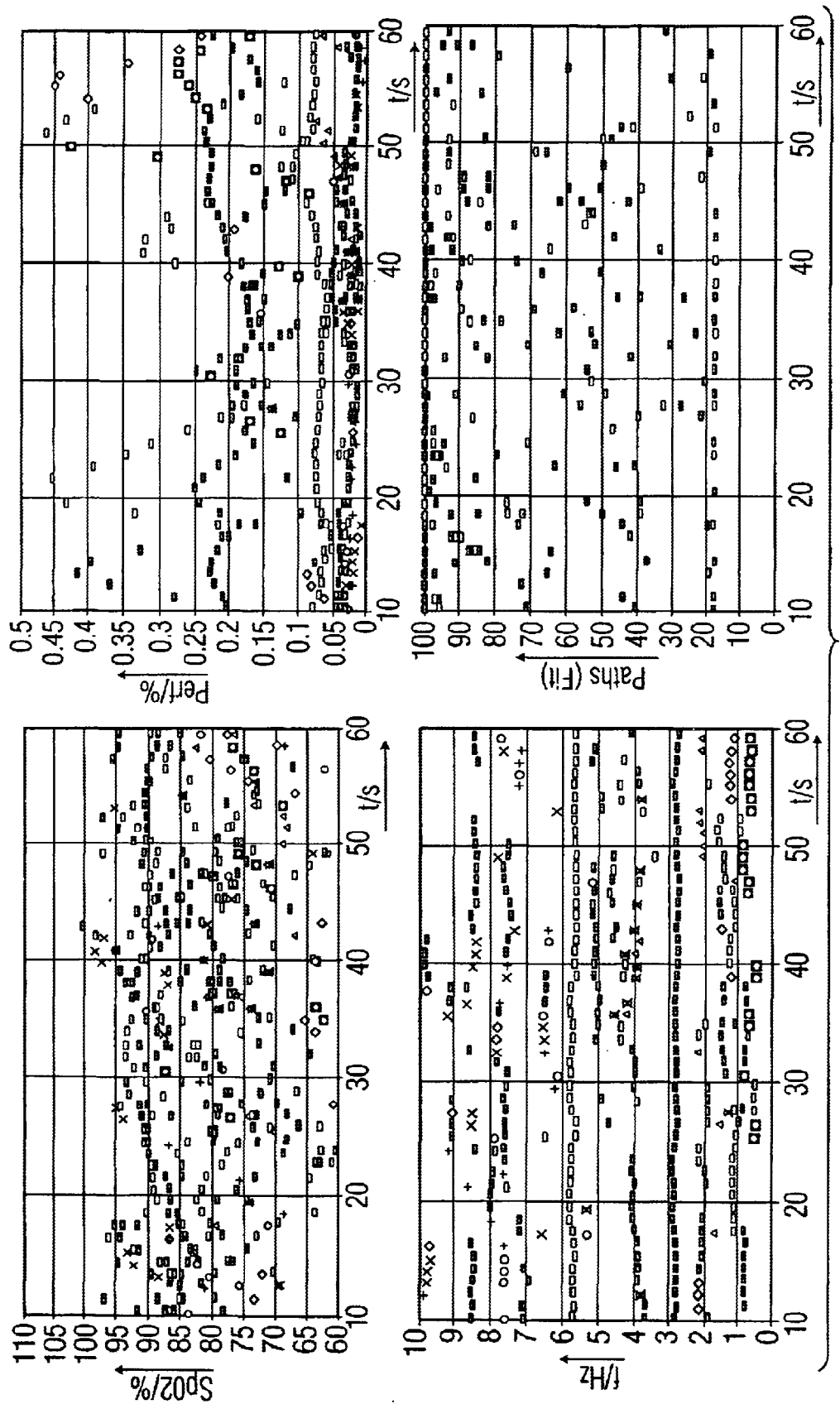

FIG. 4B shows the episode of FIG. 4A after addition of a powerful disturbance. The "disturber" causes many additional strings which also lead to further spreads in the $SpO_2$ values (compare top left) and involve a larger number of poorer fitting accuracies (compare bottom right). Viewed from the amplitude, the disturbances are partly clearly situated above the useful signal (compare top right).

Figure 4C:
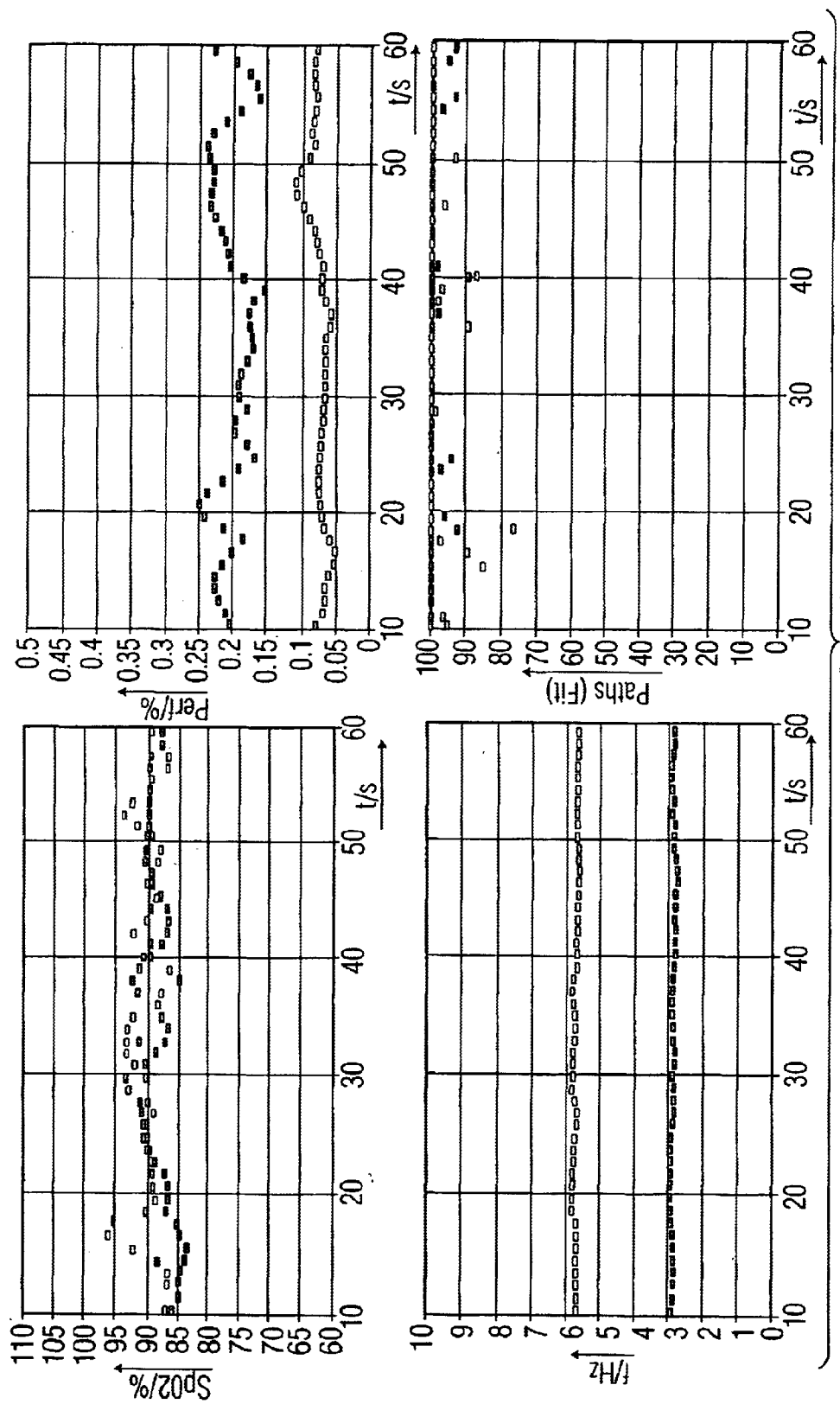

It is true that due to the addition of the disturbance in FIG. 4B a whole row of new short string sections is created but the main strings can still be unambiguously distinguished as is shown in FIG. 4C. From these selected main strings, proportionally correct output values can still be gained in a later algorithm step.

The generation of strings preferably links up in the sections:

initialization: start of the strings;

continuous link-up of fitting needles;

ending "old" run-out strings and replacement by new strings.

For initialization, the first obtained set of needles is taken to substantiate a new set of strings upon a new start (for example, when switching on the apparatus, a newly plugged sensor or an off-time after a signal search failure). To this end no further conditions for the needles need to be fulfilled.

For a link-up of fitting needles, a needle is preferably considered to be fitting when, with respect to the last link in the string, there is little deviation as regards gravity frequency $SpO_2$ value perfusion component (amplitude of the peak, length of the needle). The criteria for "fitting" are preferably defined by means of a fuzzy logic combination. To this end, the deviations are first computed between each needle i and each string k (concrete: the last linked-up needle). A maximum number of 100 comparisons is thus obtained at maximally 10 needles and 10 strings. The deviations of the gravity frequency, the $SpO_2$ value and the perfusion component are processed by means of the fuzzy logic to a fit accuracy value (Pstring), which describes the quality of the fit on a scale (for example from 0 to 100), on which the maximum number of 100 is reached when needle and string ideally or almost ideally correspond to each other. To be taken up as a needle in a string, a threshold value for the fit accuracy is preferably fixed.

The predominant part of the strings is often occupied by temporary disturbances. Due to the transient nature of many motion artifacts, no new needles can any longer be found for such strings after a short time (approximately several seconds). It is also possible that the needles which are principally available but are not acceptable remain temporarily absent for the "useful strings", because they are too much beset with disturbances. In this case, the corresponding strings for this cycle preferably remain unoccupied so that a gap is produced.

If the string of a useful signal should break, a possibility is preferably provided for new strings to be produced. This can be realized by means of the following process:
- of the unassignable needles, identify those having the largest length (perfusion component) as a candidate for starting a new string,
- identify one of the 10 strings which can be newly started, in accordance with the following list of priorities:
  1. take an unoccupied string, if still available
  2. replace the string having the largest gap, if this gap is larger than 30 s.
  3. replace the string having the poorest quality.

If the new start of a string should be impossible in the instantaneous cycle, because none of said criteria has been fulfilled, the identified candidate and all other unassignable needles are rejected.

After up to 10 strings of different quality are provided, it is checked in the next step of the processing sequence in how far given characteristic features exist between the strings, which features jointly indicate that the strings belong to the same plethysmographic useful signal. As common features between two strings, the following features are preferably used:
- an approximately harmonic frequency relation (1:2, 1:3, 2:3)
- an approximately equal $SpO_2$ value
- a possibly expected amplitude decrease of the harmonic wave range for a plethysmographic signal
- an approximately proportionally equal trend development of the frequencies
- an approximately equal trend development of the $SpO_2$ values
- an approximately proportionally equal trend development of the perfusion components.

For each string, statistics about its components, frequency, $SpO_2$ value, perfusion accuracy, number of gaps are set up which, up to the start of the string, at most but preferably reach back 25 s into the history of a string (statistic period of time). The mean value and a regression curve with the corresponding slope are determined for each component.

Each of the 10 possible strings is now compared with any other string for determining the common characteristic features. As regards the harmonic frequency relation, the test for a harmonic relation can preferably be limited only to the second harmonic wave, because the amplitude contributions of further harmonic waves are generally negligible and will become rapidly useless in the case of disturbances. A maximum number of 10×9×3=270 pairs is obtained therefrom.

By means of corresponding parameters, which are determined for each pair, it is now checked for all pairs, preferably again by means of a fuzzy operation, to what extent the common characteristic features have been fulfilled. A value of between 0 and 100 is preferably generated as a starting value for this operation, in which 100 points mean that the two strings are certainly harmonic, and 0 points mean that it can be certainly assumed that the strings originate from different signal sources, for example, from two uncorrelated disturbers such as from the useful signal and the disturbance. The intermediate values indicate a degree of association, i.e. the extent to which a harmonic is concerned. The point evaluation thus gained can also be used at a later stage for building up harmonic families and for determining their "strength".

After determining the degree of association, one of the three possible relations (1:2, 1:3, or 2:3) whose point value is largest is considered to be given for each pair of strings. Preferably, relations below a predetermined threshold are no longer accepted. After checking all pairs, a (for example, vertical) relation structure is preferably built up, which structure indicates for each string to which other strings it is related and to what extent. In the maximal case, there may be 6 such indicators, namely 3:1, 2:1, 3:2, 2:3, 1:2 and 1:3.

To achieve a criterion for the selection of strings whose contents should determine the output values at a later stage, the "value" of each string is determined at this point. To this end, 3 quantities are preferably used:
- the average fit accuracy (Pstring; see above)
- the number of valid needles in a string (i.e. the length)
- the number of gaps in a string.

The most important characteristic feature allowing assignment of a value is the average fit accuracy of the needles within a string and is preferably computed by means of a fuzzy operation for each cycle (compare Pstring in FIG. 4). Here it is expressed how closely the values regarding $SpO_2$, perfusion component and the frequency are linked up. A stable state preferably leads to a maximum number of points.

As a further quantity, the length of a string is used. It is the length of the string reduced by the number of possibly absent needles, thus by taking the gaps into account. In the optimal case, when a needle is assigned in each cycle and when the string is at least as old as is looked back into history, the length of the string is preferably assigned a value of 1.

The number of gaps in a string is preferably expressed as a quotient of the samples n with respect to the overall number of samples of a predetermined statistic interval.

The criteria of fit accuracy, number of valid needles and number of gaps are preferably combined to a point evaluation of 0 to 100 by means of a fuzzy operation. A coherent string with a good fit accuracy and without gaps should have a value of 100 points. This number of points describes the value of a string.

As the next step towards a selection of one or more strings, families of harmonic waves should now be built up, whose strength is described by the previously gained values of the strings and their degree of association.

A family should consist of one to three strings, namely fundamental wave, first harmonic wave plus possibly second harmonic wave. The inclusion of further harmonic waves has not proved to be useful in pulsoximetry. The assignment is built up in accordance with the above-described criteria and relations for the concatenation of strings to harmonic waves. The existence of a harmonic wave is attached to the criteria mentioned. It is important whether a direct relation for the fundamental wave or only an indirect relation in boundary cases was found. For example, the relation 1:2 may be absent (because it is too bad), but the relations 1:3 and 2:3 fulfill the existence criteria and thereby indirectly indicate the first harmonic wave.

Preferably, up to 10 families should be built up, in which it should also be possible that, under circumstances, a string simultaneously belongs to different families. As a limitation for the establishment of a family, it is, however, required that the frequency of the fundamental wave must be within a physiologically useful range. Favorable specification limits have proved to be between 28 and 310 bpm.

A combination of input parameters is performed preferably again by means of a fuzzy operation:
- existence of fundamental wave, 1 st harmonic wave and 2nd harmonic wave value of the string (as described above) of fundamental wave, $1^{st}$ harmonic wave and $2^{nd}$ harmonic wave quality of relation between fundamental wave and $1^{st}$ harmonic wave (1:2), fundamental wave and $2^{nd}$ harmonic wave (1:3), $1^{st}$ harmonic wave and $2^{nd}$ harmonic wave (2:3).

With the aid of this control system, families having the complete set of harmonic waves should be assigned more points than those having only one harmonic wave or none at all. The value of the string should be more strongly evaluated for the fundamental wave than for the harmonic waves. Furthermore, the direct relation with the fundamental wave should have a stronger influence than the relation among the harmonic waves themselves. A full number of points (preferably 100) can be reached in so far as the set of harmonic waves is complete, a clear harmonic relation is provided and the signal is stable (high value of the string). When the second harmonic wave is absent, only a reduced maximal value (for example 86 points) can be reached. However, when the first harmonic wave is absent, a maximal value which is even more reduced (to, for example, 67 points) can be reached. If the family consists of one string only, the fundamental wave, the upper limitation is reduced to an even lower maximal value (to, for example, 31 points).

With the determination of the strength of a family thus obtained, a very good criterion is provided to decide which family of strings can be interpreted as a useful signal. In fact, the useful signal is often also the strongest in the sense of maximum strength and hence number of points. In critical cases, this parameter is, however, not always sufficient for taking a correct decision. For this reason, further quantities are preferably used. As potential candidates for a selection, all families whose point value fulfills the strength of a minimal requirement (for example, 30 points) are first taken into consideration. In order that a family is to be used for outputting or deriving output values, it should tendentially fulfill the following requirements in a relative comparison of the candidates:

high number of points for the determined strength of the family high $SpO_2$ value, for example mean value of the fundamental wave a previously lower pulse rate a high perfusion.

The combination of these criteria should preferably be performed again by means of a fuzzy operation. As a result of this combination, there should again be a point evaluation, preferably in a range between 0 and 100, in which the family having the highest number of points is intended to be output.

In artifact situations, it often occurs that the fundamental wave of the useful signal is proportionally strongly superimposed with disturbances, while the harmonic waves are less disturbed. Then it may happen that, based on a small distribution of points, the correct family of the useful signal gets an overall lower number of points and is not used for outputting, as in contrast with a family which is based on a harmonic wave. For this reason, it is preferably checked before outputting whether the family selected on the basis of the highest distribution of points may still have sub-harmonics, i.e. whether it actually builds up on a harmonic wave. When such a sub-harmonic wave exists and when the family of the sub-harmonics has a sufficient strength (preferably at least 0.3 times the strength of the selected harmonic wave), the sub-harmonic instead of the selected harmonic wave is chosen as an output. When there are more sub-harmonics to be selected, the one with the largest strength is selected.

In the manner described above, a family of strings has now been selected which has the greatest probability of representing the useful signal.

In a preferred embodiment, a comparison of the family to be output with predecessor values takes place prior to outputting. In transient situations, it is very well possible that competitive families which are based on, for example, rhythmic disturbances become temporarily dominant and reach the highest number of points. This problem can be recognized and suppressed by means of an expected value comparison. As expected values, the last values supplied as indicator values of the pulsoximeter are preferably used, such as, for example $SpO_2$ value, pulse rate and perfusion. The differences between the current values of the fundamental wave string of the selected family (the last linked-up needle) and the expected values are preferably formed again by means of a fuzzy operation. The deviations from the expected values are subjected to a further combination, preferably again by means of a fuzzy operation, where they should generate a factor which decides about its fit with the last output value. When the comparison leads to a result in which the fit value is larger than a predetermined threshold value, this sample of the fundamental wave string and hence the whole family is accepted as fitting and is provided for an output. In the other case, the subsequently provided family is rejected again and cannot be used for updating the output.

Upon a new start, the comparison of the outputting family with predecessor values should be stopped and the output suppression remains switched off as long as there is a first comparison value. As a safety measure against a link-up with old comparison values, a restoring mechanism is preferably built in for those cases in which unusual, unexpectedly large deviations occur, which would not follow the algorithm.

When a family is uninterruptedly available for output during a longer period of time than a predetermined period of time (preferably 4 s) and when it is, however, suppressed every time, this family is nevertheless output if its strength exceeds a given value (preferably>35 points).

In the next cycle, these values may be used as new comparison values in further processes. This measure ensures that the algorithm can regenerate rapidly, for example, after "accidents" due to massive temporary disturbances, as soon as the signal is usable again.

In the method described so far, the needles are linked up to form strings, the strings are composed to form families and one of these families is finally selected as the "winner". The different components of these families are now used for determining the pulsoximeter values. The following values should preferably be indicated:

oxygen saturation ($SpO_2$)

pulse rate (PR)

perfusion index (Perf)

measuring standby/state indication (INOP)

signal quality indicator (QI).

Basically, a family consists of a fundamental wave with an additional first and second harmonic wave, in so far as derivable. In general, harmonic waves are present and, in undisturbed cases, comprise the same information about $SpO_2$ and PR as the fundamental wave. They thereby represent a redundant data source. As the fundamental wave always becomes clearly stronger than the harmonic waves, it will usually provide better information as soon as disturbances occur. However, there are numerous situations in which the harmonic waves of the families are clearly less relevant (for example, in neonates). The perfusion index in neonates is typically 0.5% (measured at feet/hands), but with adults values around 2% (measured at the fingers) are found. In new born babies, the pulse rate is of course high (typically: 130 . . . 200 bpm) but the motion disturbances mostly have a low frequency. As a result, the disturbing distance in the harmonic waves may still be smaller than in the fundamental wave.

Figure 5:
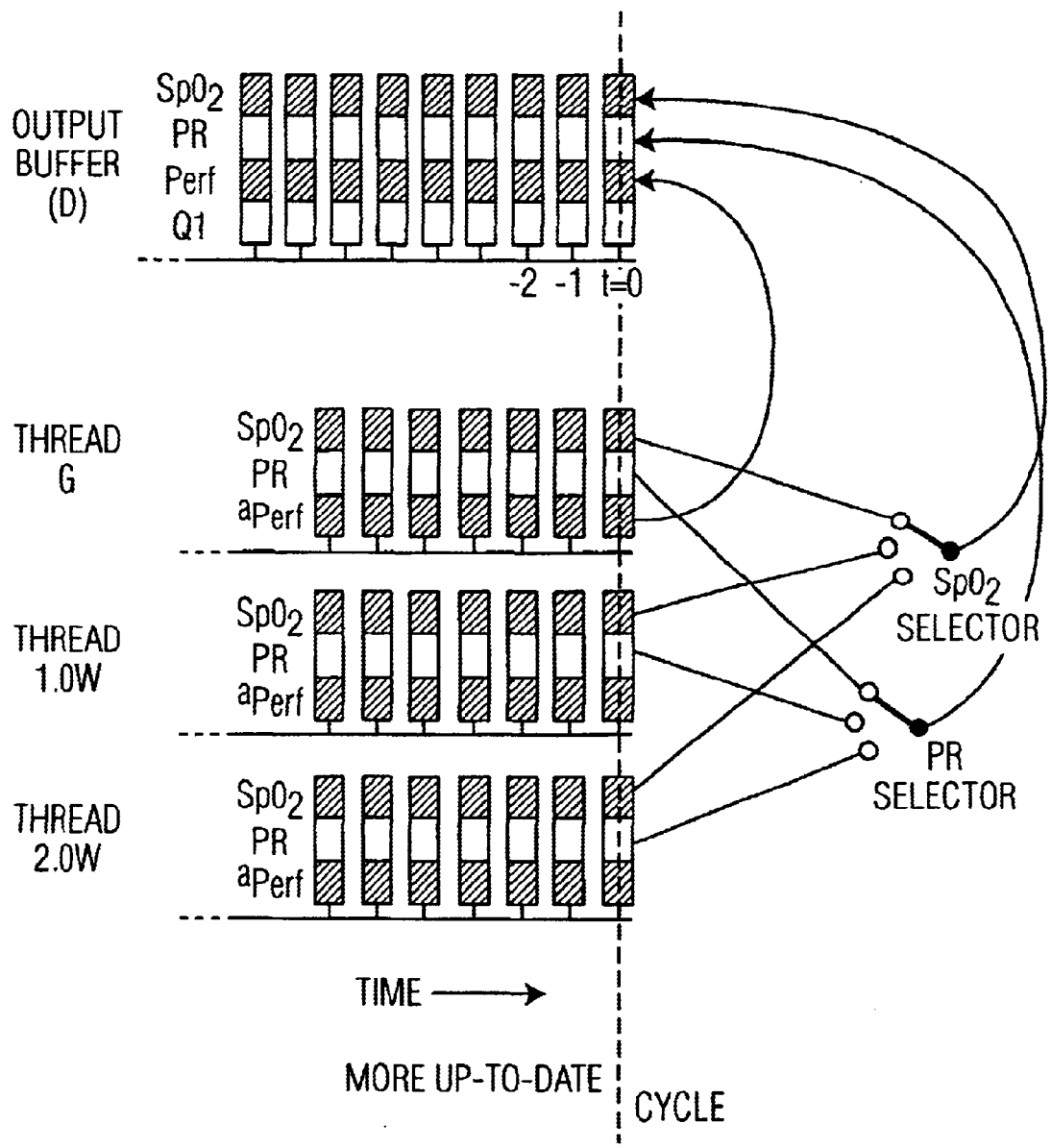
FIG. 5 shows diagrammatically a filling of an output store by utilizing the harmonic waves.

To obtain an output value, the current values of the selected families are preferably written into an output store which stores the recent history. Per statistic, the indicator values are finally determined from this store. In this respect, current values are understood to mean the ends of the strings, i.e. the needles linked up in the instantaneous cycle. FIG. 5 shows diagrammatically the filling of an output store by using the harmonic waves. The output values for $SpO_2$ and PR may optionally be taken from the fundamental wave or harmonic waves of the selected family. In the perfusion index, the assignment should be fixed in the fundamental wave. Which of the three strings in the family should be used for the indication depends on the fact whether these values fit in with the last indicator value. To this end, the differences of the $SPO_2$ values and the PR values between the fundamental waves and harmonic waves, in so far as they exist, are formed for each member of the family. Via a minimum function, applied to the determined differences, it is then determined which component is written into the output store D. This method is based on the assumption that $SpO_2$ value and pulse rate change to a small extent from cycle to cycle so that those family components are preferred which are possibly near the old values. This is particularly effective when disturbances lead to strong fluctuations of the different needles, and it contributes to a smoothing of the signal. A further important contribution is that in the case of instantaneously absent fundamental wave needles (which may happen in the case of massive disturbances) the output can nevertheless be refreshed by the harmonic waves. However, minor drawbacks are obtained when in the case of disturbances a gradient of the $SpO_2$ trend or the pulse rate trend occurs simultaneously. Then the tendency towards the old value has the result that the neighboring "outliers" are taken up instead of the drifting correct values.

For the perfusion index, this switching possibility between the harmonics does not function because it is not possible to go from the perfusion component of a harmonic wave to the component of the fundamental wave or of the other harmonic waves. Consequently, the perfusion component of the fundamental wave is always used. When the fundamental wave drops out due to excessive disturbances, it is preferred to fall back on the predecessor value.

Since there is generally no reason for a continuous update of the derived values in a pulsoximeter, the values may therefore be filtered during a given period of time before their output. In addition to the smoothing of irrelevant physiological variations, such a filter function has a high value, particularly in the case of fluctuations caused by disturbances. In the algorithm shown, the unfiltered output values occur with a cycle time of one second and are then preferably written into the output store (preferably with a maximum depth of 70 s). A trimmed mean filter is preferably used as a filter, which filter combines the function of a median filter and averager: the n values to be filtered are sorted in accordance with their magnitude and the k largest and k smallest values are rejected (2k<n; k, n integral). The remaining values are arithmetically averaged. This filter allows a satisfactory smoothing, a rapid step function response, small delays, no noticeable overshoots, only a small influence of extreme "outliers" and a stable variation in the case of steady changes.

Since there are no needles in many cycles with which the output store can be filled and no or only a few history values are available upon run-in after a new start, the following instructions are preferably carried out:

go back into the output store at least so far until 5 valid samples are available. The history limitation is 70 s; in the run-in phase up to maximally the starting instant (initialization of the filter).

go back into history up to maximally 13 s when 5 valid samples were already detected previously.

output the trimmed mean of the detected valid values with k/n=0.25.

In the normal case, when all samples are valid, a filtering is obtained through the last seconds (here, for example 13 s), dependent on the predetermined time windows. If strong disturbances occur and measured values remain absent (which leads to gaps in the output store), the period of time is extended into history until a minimal number of preferably 5 values is reached. In the extreme case (after the run-in phase) this may mean that one goes back up to 70 s. If even then no 5 samples have been detected, there is an interruption at this position and the computation will be effected with the trimmed mean values detected until that instant. When it comes to a total failure of the measured values and when no valid value can be found as far back as the starting instant, the old output value will be maintained. This "clipboard" behavior can, however, be tolerated only for a given period of time.

The pulsoximeter according to the invention preferably provides information about the state of signal detection when the normal operation is not possible. Such states are usually referred to as "INOP" (inoperative). An interruption of the flow of values in the output store is preferably tolerated for a given period of time (for example, the first 10 s), and there will be no message. The output values are preferably refreshed in accordance with the above-mentioned filter algorithm, and subsequently put on the clipboard. An INOP state indication should not become effective until after the gap in the output store has exceeded the prescribed instant.

What is claimed is:

1. A method of recognizing a useful signal in a physical measurement signal, the method comprising the steps of
    (a) transforming the measurement signal for a given time slot into the frequency range, by means of a Fourier transform,
    (b) identifying frequency peaks in the transformed measurement signal,
    (c) assigning identified frequency peaks to temporal progressions of identified frequency peaks of one or more preceding time slots to when identified frequency peaks are already present,
    (d) assigning the temporal progressions to one or more families which are comprised of a fundamental wave and/or of one or more attendant harmonic waves,
    (e) selecting a family as that which should represent the useful signal, and
    (f) selecting a frequency peak of the given time slot from the selected family as that which should represent the measured value of the useful signal in this time slot.

2. The method as claimed in claim 1, wherein, in step (c), the assignment is effected by
    (c1) initialization, at which the first obtained set of frequency peaks is taken to establish a set of progressions, (c2) continuous link-up of fitting frequency peaks, a frequency peak being considered to be fitting when only small deviations regarding predetermined criteria occur in the last link of the progression, and wherein preferably a gap remains if no new frequency peak can be assigned to an available frequency peak, and the progression is either ended or replaced by a new progression if the gap becomes too long.

3. The method as claimed in claim 1, wherein, in step (d), the assignment is effected by examining the extent that given characteristic features exist between the progressions, which characteristic features jointly indicate that the progressions belong to the same useful signal, by some combination of a harmonic frequency relation, an expected amplitude decrease of the harmonic wave range or a proportionally equal trend development of the frequencies and/or amplitudes.

4. The method as claimed in claim 1, wherein, in step (e), the selection is effected by determining a greatest probability for the representation of the useful signal by the selected family.

5. The method as claimed in claim 1, wherein, in step (e), the selection is effected by combining predetermined criteria, including the existence of fundamental wave and/or harmonic wave(s), average fit accuracy of the progressions, number of valid frequency peaks in a progression, uniformity of a progression or quality of relation between fundamental wave and harmonic wave (s).

6. The method as claimed in claim 1, wherein, in step (e), the selection is effected by means of a plausibility test of the family with respect to previous output values, with the most plausible family being selected.

7. The method as claimed in claim 1, wherein, in step (f), the measured value of the useful signal is determined from the selected frequency peak.

8. The method as claimed in claim 1, wherein, in step (f), the selection is made by determining a greatest probability for the representation of the measured value of the useful signal by the selected frequency peak, by combining predetermined criteria by means of a fuzzy logic, the criteria being those that are set for a plausibility of the current measured value with respect to previous measured values and/or expected or useful values.

9. The method as claimed in claim 1, wherein, after step (f), a plausibility check is performed to check whether the selected frequency peak also actually corresponds to an expected measured value of the useful signal and/or whether a measured value derived from the selected frequency peak is to lead to an output, or whether no measured value at all should be output for this time slot, by comparing the measured value with previous measured values and/or with expected or useful values.

10. The method as claimed in claim 1 wherein the measurement signal is a physiological measurement signal and the method further includes the step of determining oxygen content of the blood or heart rate.

11. A computer program product stored on a storage medium which is readable by means of a computer, the computer program comprising a code for performing the steps as claimed in claim 1, when the program is run on a computer.

12. A device for recognizing a useful signal in a physical measurement signal, the device comprising:

means for transforming the measurement signal for a current time slot into the frequency range by a Fourier transform, means for identifying frequency peaks in the transformed measurement signal, means for assigning identified frequency peaks to temporal progressions of identified frequency peaks of one or more preceding time slots when identified frequency peaks are already present, means for assigning the temporal progressions to one or more families which are comprised of a fundamental wave and/or of one or more attendant harmonic waves, means for selecting a family as that which should represent the useful signal, and means for selecting a frequency peak of the current time slot from the selected family as that which should represent the measured value of the useful signal in this time slot.

13. A device for recognizing a useful signal in a physical measurement signal as claimed in claim 12, wherein the measurement signal is a pulsoximetry signal and the device further includes means for determining oxygen content of the blood from the selected frequency peak.

* * * * *